Patented May 31, 1932

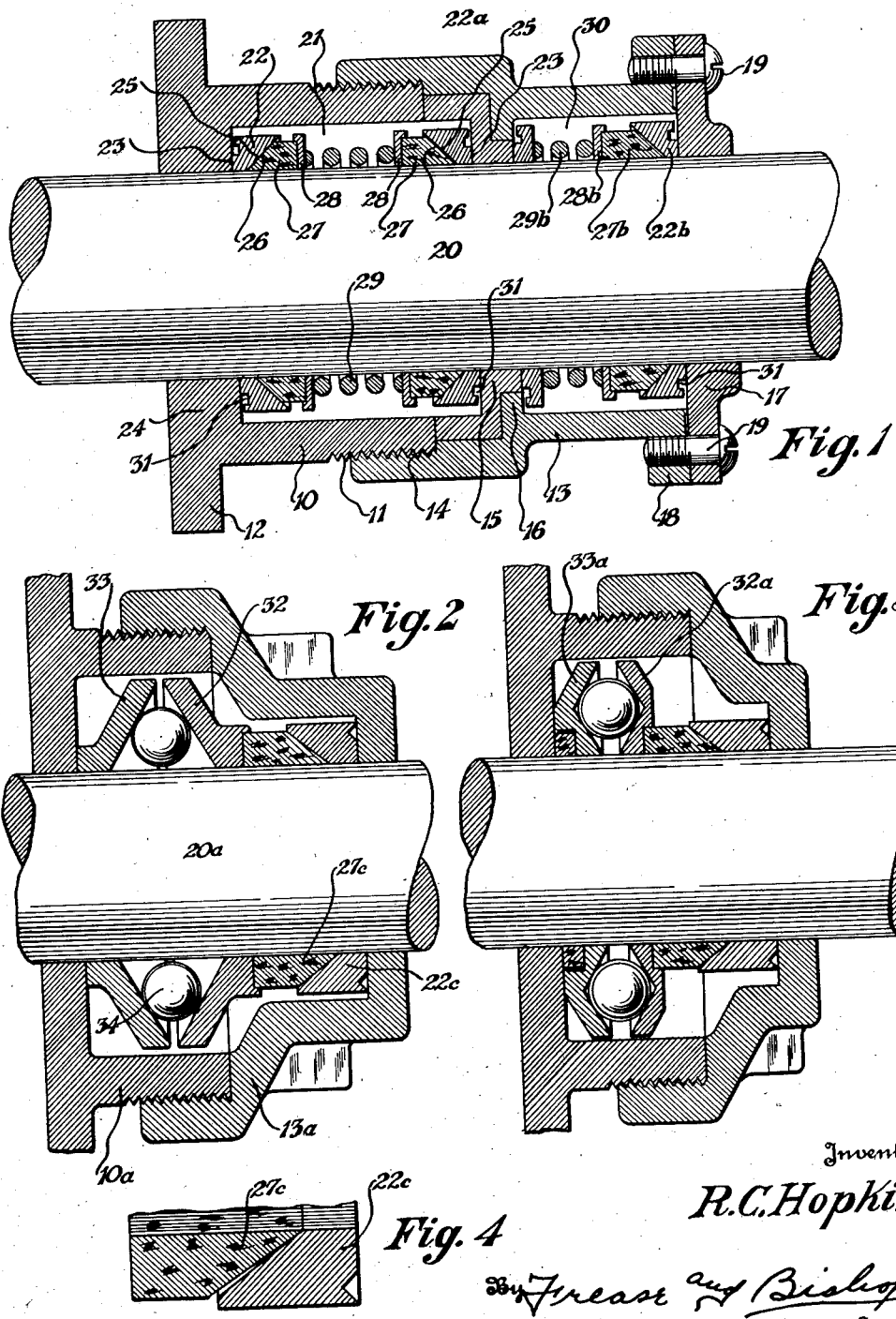

1,861,275

UNITED STATES PATENT OFFICE

ROBERT C. HOPKINS, OF ALLIANCE, OHIO

SHAFT PACKING

Application filed May 28, 1930. Serial No. 456,409.

The invention relates to packing for rotating shafts and is adapted for use in pumps or any other kind of machinery provided with a rotating shaft located through a pressure chamber of vacuum chamber.

The object of the improvement is to provide a shaft packing which will effectually seal the shaft against pressure as well as vacuum or suction.

Another object is to provide a seal ring for the packing composed of compressed cork or prepared cork with or without oil resisting impregnation.

Another object of the improvement is to provide a packing including a packing ring and a wearing ring having cooperating tapered faces, one of the rings being tapered at a greater angle than the other so as to produce a wedging effect when the rings are pressed together.

A still further object is to provide a concentric groove around the outer end of the metal wearing ring, slightly spaced from the packing nut for the purpose of setting up a spinning motion of the oil within the gland, this spinning motion producing a centrifugal force against the pressure on the inside of the gland, thereby lessening the tendency for leakage between the surfaces of the wearing ring and the nut.

Another object of the improvement is to provide spring means for holding the packing ring in engagement with the wearing ring.

A still further object is to provide a plurality of balls arranged to rotate around the shaft and, by centrifugal force, urge the packing ring into tight engagement with the wearing ring.

The above and other objects may be accomplished by constructing the improved shaft packing in the manner illustrated in the accompanying drawings, in which Figure 1 is a longitudinal section through a gland having a rotating shaft therein, the improved packing being shown around the shaft;

Fig. 2, a longitudinal sectional view through a gland having a modified form of the invention in which the balls are provided;

Fig. 3, a similar view showing a modification of the ball arrangement; and

Fig. 4, a fragmentary sectional view on a larger scale showing portions of the packing ring and wearing ring before they are forced together, illustrating the difference in angle of the beveled meeting faces of the two rings.

Similar numerals refer to similar parts throughout the drawings.

Referring first to the form of the invention shown in Figure 1, a gland for use upon a pump or other machine is illustrated including the hollow cylindric portion 10 with external screw threads 11 thereon, said cylindric portion being either formed integral with the adjacent wall of the housing for the pump or other machine or flanged as at 12 for connection thereto.

The hollow cylindric nut 13 is provided with internal screw threads 14 adapted to be received upon the threads 11 and, where it is desired to provide a double chambered gland as shown in this figure, a central partition plate 15 may be fixed against the outer end of the hollow cylinder 10 as by the internal annular flange 16 upon the cylindric nut. The end wall of the nut may be integral or if desired, as shown in Fig. 1, may be in the form of a separate plate 17 attached to the peripheral flange 18 of the nut as by the screws 19.

A rotatable shaft 20 is journaled through the gland and adapted to be sealed to prevent leakage of oil or other fluid from the interior of the pump or other machine outward through the gland as well as preventing the leakage of any fluid from the exterior through the gland into the machine in the event the same is of such type as to create a suction or vacuum.

This sealing means comprises a metallic wearing ring which may be of steel, iron or bronze, surrounding the shaft and adapted to be forced against one end of the gland, and a packing ring of compressed cork or prepared cork which may, if desired, contain oil resisting impregnation; the contacting faces of the two rings being beveled at different angles and means being provided for forcing the packing ring against the wearing ring to tightly wedge the soft cork ring between the wearing ring and shaft to effectually seal the same.

As shown in Fig. 1, a triple seal may be provided by sealing the shaft at each end of the gland and also at the central partition 15.

The main or larger chamber 21 may be provided with a double sealing device comprising the metallic wearing rings 22 and 22a having their outer surfaces 23 machined and adapted to be held against the inner wall 24 and partition wall 15 of the gland respectively.

Each of these wearing rings has its inner face 25 beveled for engagement with the beveled faces 26 of the cork packing rings 27 which are beveled at a different angle from the wearing rings in order to produce a wedging effect similar to the action of a bottle cork or stopper in order to compress the cork ring around the shaft and effectually seal the same.

When the packing ring is forced toward the wearing ring, the engagement between the differently angled faces occurs near the beveled edge of the packing ring, tending to force the edge portion thereof into engagement with the shaft. As the edge portion of the packing ring wears off, the ring will be forced further toward the wearing ring so that the beveled edge of the packing ring is always compressed more than the body of the ring.

A retaining ring 28 fits against the inner face of each packing ring to prevent wear upon the same by the action of the coil spring 29 which surrounds the shaft and is interposed between the two retaining rings for the purpose of forcing the two cork rings tightly against the wearing rings, compressing the cork as above described.

A similar wearing ring 22b is located within the smaller or outer chamber 30 of the gland and cooperates with a similar cork ring 27b provided with a retaining ring 28b and coil spring 29b for compressing the cork ring and holding the wearing ring against the outer wall 17 of the nut.

Each of the wearing rings has a concentric groove 31 in its outer face, slightly spaced from the adjacent wall of the gland or nut, the purpose of this groove being to set up a spinning motion of the oil within the gland and through this spinning motion a centrifugal force is created against he pressure on the inside of the gland, thereby lessening the tendency to leak between the surfaces of the packing ring and the nut.

In Fig. 2 a modified form of the invention is shown in which the gland may include the threaded hollow cylindric portion 10a and the nut 13a. The wearing ring 22c and packing ring 27c may be of substantially the same construction as above described.

A conical ring 32 engages the inner face of the cork ring and a similar ring 33, oppositely disposed to the ring 32, is located between the ring 32 and the inner wall of the gland.

A plurality of balls 34 is provided between the conical rings 32 and 33 and since the rings have a sliding fit upon the shaft 20a, it will be seen that when the shaft is rotated at a high speed a centrifugal force is developed which throws the balls 34 outward and tends to spread the conical rings with the effect of expanding the rings along the shaft and producing a pressure against the packing ring 27c, compressing the same against the wearing ring 22c to prevent leakage between the shaft and the nut of the gland.

In Fig. 3 the ball cork seal is slightly modified from that shown in Fig. 2, the rings 32a and 33a being of double conical construction employing either gravity or centrifugal action to spread the rings and compress the cork packing ring as above described.

In the case of slow moving shafts the gravity principle is employed in the wedging action of expanding the rings so as to assist the motive pressure in compressing the cork ring against leakage.

In both of the forms shown in Figs. 2 and 3 the wedging action of the cork rings, as described with reference to Fig. 1, is employed, and in this way leakage around the shaft is prevented by constricting or compressing the cork ring as it reacts to the pressure.

In using the balls as shown in Figs. 2 and 3, these balls will not roll or travel after once getting into motion but will simply bear against the inclined surfaces of the conical rings to expand the same and compress the cork ring.

In Fig. 4 is shown a fragmentary sectional view of a portion of a wearing ring and cork packing ring which may be used in any of the forms of the invention, showing the difference in angle of the beveled faces of the cork and metallic ring before the cork ring has been compressed.

Although a double seal is illustrated in Fig. 1, it will be understood that this form of the invention may be carried out with a single seal in the same manner as illustrated and described with relation to Figs. 2 and 3.

There are two reasons for using this single seal construction, one of them being to reduce the cost and the other to admit a slight leakage from the cylinder of the pump or other machine upon which the gland is mounted, for lubrication in the gland if necessary or desirable.

I claim:

1. In combination with a gland and the like having spaced walls, a rotating shaft journaled through said walls, a wearing ring surrounding the shaft adjacent to one wall and having an inner beveled face, a packing ring surrounding the shaft and having an outer beveled face at a different angle than the beveled face of the wearing ring, and centrifugal means between the other wall and the packing ring for urging the packing ring toward the wearing ring to compress the packing ring around the shaft.

2. In combination with a gland and the like having spaced walls, a rotating shaft journaled through said walls, a wearing ring surrounding the shaft adjacent to one wall and having an inner beveled face, a packing ring surrounding the shaft and having an outer beveled face at a different angle than the beveled face of the wearing ring, and ball means between the other wall and the packing ring for urging the packing ring toward the wearing ring to compress the packing ring around the shaft.

3. In combination with a gland and the like having spaced walls, a rotating shaft journaled through said walls, a wearing ring surrounding the shaft adjacent to one wall, a packing ring surrounding the shaft and adapted to engage the adjacent face of the wearing ring, a pair of opposed rings between the packing ring and the other wall of the gland, each of said rings having a V-shaped annular groove therein and balls located in said grooves whereby at high speed the rings will be centrifugally separated and at low speed the rings will be gravity separated by action of the balls to compress the packing ring.

4. In combination with a gland and the like having spaced walls, a rotating shaft journaled through said walls, a wearing ring surrounding the shaft adjacent to one wall, a packing ring surrounding the shaft, and centrifugal means between the other wall and the packing ring for urging the packing ring toward the wearing ring to compress the packing ring around the shaft.

5. In combination with a gland and the like having spaced walls, a rotating shaft journaled through said walls, a wearing ring surrounding the shaft adjacent to one wall and having an inner beveled face, a packing ring surrounding the shaft and having an outer beveled face, and centrifugal means between the other wall and the packing ring for urging the packing ring toward the wearing ring to compress the packing ring around the shaft.

In testimony that I claim the above, I have hereunto subscribed my name.

ROBERT C. HOPKINS.